US005960691A

United States Patent [19]

Garuglieri

[11] Patent Number: 5,960,691

[45] Date of Patent: *Oct. 5, 1999

[54] CHOP/TABLE SAW ARRANGEMENT

[75] Inventor: Andrea Garuglieri, Colle Brianza, Italy

[73] Assignee: Black & Decker Inc., Newark, Del.

[ * ] Notice: This patent is subject to a terminal disclaimer.

[21] Appl. No.: 09/038,646

[22] Filed: Mar. 11, 1998

Related U.S. Application Data

[63] Continuation of application No. 08/791,085, Jan. 29, 1997, Pat. No. 5,787,779, which is a continuation of application No. 08/590,080, Jan. 17, 1996, abandoned, which is a continuation of application No. 08/272,184, Jul. 8, 1994, abandoned.

[30] Foreign Application Priority Data

Jul. 8, 1993 [GB] United Kingdom .................... 9314163

[51] Int. Cl.$^{6}$ .................................................... B23D 45/00

[52] U.S. Cl. .......................... 83/471.2; 83/490; 83/477.1; 83/477.2; 83/478; 83/397.1

[58] Field of Search .................................... 83/490, 471.3, 83/397, 589, 585, 477.1, 477.2, 471.2, 588, 478, 397.1

[56] References Cited

U.S. PATENT DOCUMENTS

| | | | |
|---|---|---|---|
| 3,570,564 | 3/1971 | Bergler | 83/471.3 |
| 4,774,866 | 10/1988 | Dehari et al. | 83/490 X |
| 4,799,416 | 1/1989 | Kumasaka et al. | 83/490 X |
| 5,046,390 | 9/1991 | Sasaki | 83/490 X |
| 5,513,548 | 5/1996 | Garuglieri | 83/397 |
| 5,787,779 | 8/1998 | Garuglieri | 83/397 |

*Primary Examiner*—Rinaldi I. Rada
*Assistant Examiner*—Ana Luna
*Attorney, Agent, or Firm*—Adan Ayala

[57] ABSTRACT

A saw (10) comprises a frame, a table (12) mounted in the frame and adapted to adopt two positions. A pivot member (14) is on a first side of the table and a saw assembly (16) is pivoted (at 18) to the pivot member. A blade (26) is journalled in the assembly and a motor (22) drives the blade. A spring (124) between the pivot member and saw assembly biasses the saw assembly away from the table a slot in the table permits the blade to protrude through the table. In a first of said two positions of the table, the saw assembly is above the table and the saw is a chop saw for performing plunge cuts on workpieces supported on said first side of the table (FIG. 1). In a second of said two positions, the saw assembly as below the table and the saw is a bench saw for performing cuts on workpieces passed through the blade on a second opposite side of the table (FIG. 2). The spring acts on an intermediate element (114, 132) which has two dispositions, in a first of which the spring supports the weight of the saw assembly when the table is in its first position. In the second disposition the spring bias is released.

15 Claims, 7 Drawing Sheets

Figure 1A:
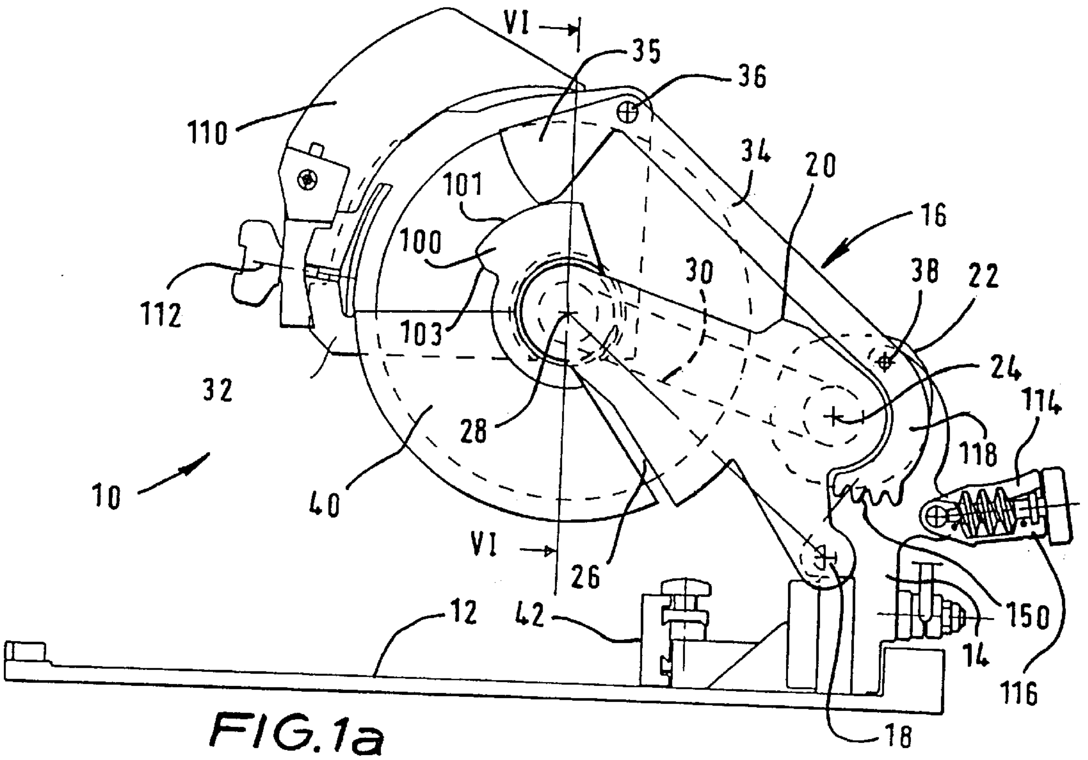
Figure 1B:
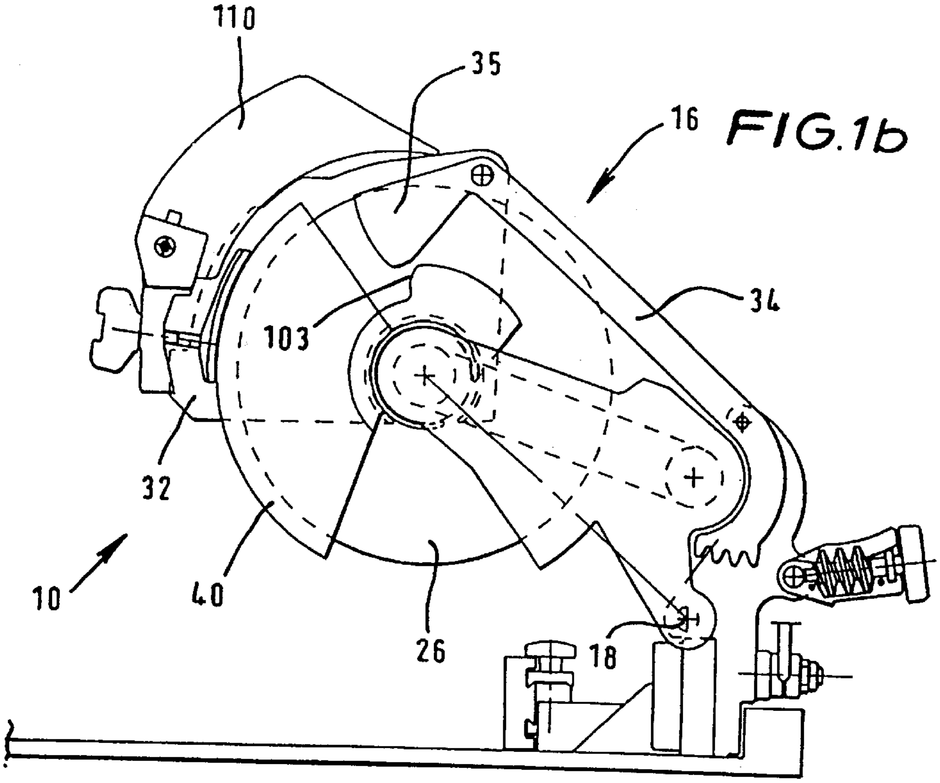

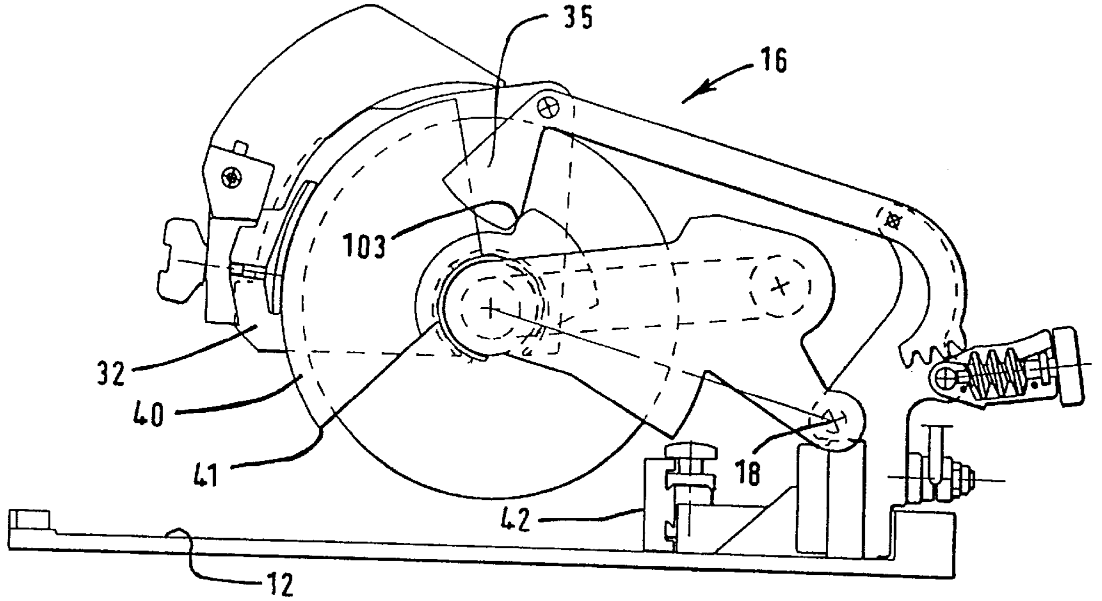
FIG.1c
FIG.1d
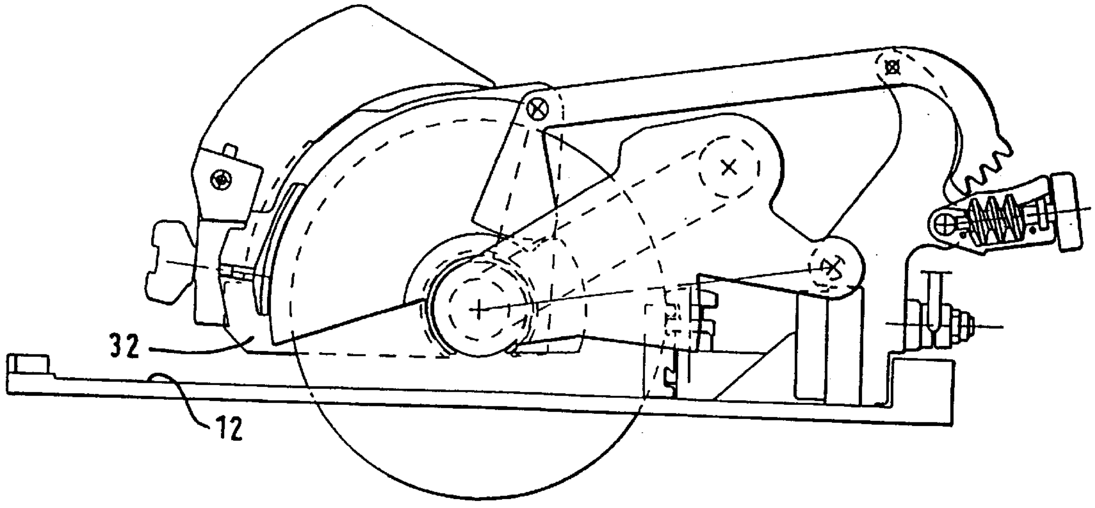

CHOP/TABLE SAW ARRANGEMENT

This is a continuation of application Ser. No. 08/791,085, now U.S. Pat. No. 5,787,779, filed Jan. 29, 1997, which in turn is a continuation of application Ser. No. 08/590,080, now abandoned, filed Jan. 17, 1996, which in turn is a continuation of application Ser. No. 08/272,184, now abandoned, filed Jul. 08, 1994.

This invention relates to circular saws of the type comprising a table, a pivot member on the table and a saw assembly pivoted about a pivot axis with respect to said pivot member, whereby said saw assembly carrying a motor driven blade can be plunged into a workpiece supported on the table.

Such saws are known and described in published patent documents such as EP 0133666 and EP 0450400. These saws are useful and have numerous possibilities for enhancement to improve the capacity, capability and efficiency, not to mention cleanliness and safety of their arrangements. On the other hand, all these features add complexity and cost, and may render the saw user unfriendly.

The present invention particularly relates to saws of the type described above but which in addition have the table mounted in a frame such that the table may be inverted, as by pivoting about an axis, so that the saw assembly is then beneath the table. The table is in addition provided with a slot so that the blade can protrude through the slot to render the saw a bench or table saw. Such saws are known and described in DE 1628992 and EP 0502350.

Both EP 0133666 and EP 0450400 mentioned above describe saws in which the saw assembly comprises an upper guard and a lower guard for the blade. The upper guard is formed from the housing of the assembly and permanently covers a top part of the blade. A bottom part of the blade is covered by the lower guard but this must be withdrawn in use so that the blade is exposed when required to perform cutting operations.

A handle is disposed on the upper guard by means of which a user can pivot the saw assembly up and down to perform cutting operations on a workpiece supported on the table.

The lower guard may be opened entirely by an actuating lever disposed on said handle. Alternatively the guard may be opened automatically by pivoting of the saw assembly, there being provided a connection between the guard and the pivot member for this purpose. A further alternative is that the guard may be opened partly by either of these arrangements and only further opened by direct contact with a workpiece.

Means must be provided to bias the saw assembly to a raised, upright position when it is at rest so that the user is not required to lift the not-insignificant weight of the saw assembly after completing a plunge cut. Such means is normally in the form of a powerful spring.

However, a problem arises when the saw is of the second type mentioned above and the table is flipped-over to convert the saw into a bench saw. Now the weight of the saw assembly acts in the opposite direction with respect to the table, whereas the spring or other biassing means usually acts in the same sense. Moreover, in the bench saw mode, the saw assembly (before the table is flipped over) is plunged into the table so that the blade protrudes right through the slot. This serves to tension the spring even more and further exacerbates a problem experienced with depth of cut adjustment mechanisms.

When in the bench saw mode, an adjustment that needs to be provided is the depth of cut of the saw blade; that is to say, the extent to which it protrudes through the slot.

This adjustment must be convenient for the user to employ and since it is not usually critical in terms of accuracy it is desirable to have a knob or handle which, with only a few turns, effects the adjustment between minimum and maximum depth of cut.

However, if the weight of the saw and the effect of the spring biasing means (in its most tensioned position) combine to act on the adjustment means, this usually dictates that a fine, that is to say, highly geared, form of adjustment must be employed because a coarse form will (in one direction) be difficult to operate, because the saw assembly must be raised against its own weight and the pressure of the spring biasing, and may be precipitous in the other direction.

It is an object of the present invention to provide a saw of the types described above in which the problems associated with flip-over of the saw table as described above are removed, or at least their effects are mitigated.

In accordance with this invention there is provided a saw comprising a frame, a table mounted in the frame and adapted to adopt two positions, a pivot member on a first side of the table, a saw assembly pivoted with respect to the pivot member, a blade journalled in said assembly, a motor to drive the blade, spring means between the pivot member and saw assembly to bias the saw assembly away from the table, a slot in the table through which said blade is adapted to protrude, in a first of said two positions of the table the saw assembly being above the table, the saw thereby forming a chop saw for performing plunge cuts on workpieces supported on said first side of the table, and, in a second of said two positions of the table, the saw assembly being below the table and the saw thereby forming a bench saw for performing cuts on workpieces passed through the blade on a second opposite side of the table, said spring means acting on an intermediate element disposed between the saw assembly and pivot member, the intermediate element having two dispositions, in a first of which dispositions said spring means supports the weight of said saw assembly when the table is in its first position and in a second of which dispositions said bias is substantially removed.

Thus in the bench saw mode of use of the saw according to the present invention, the additional effect of the spring means on the depth of cut adjustment (as may be provided) is removed so that a coarser form of adjustment may be employed.

Indeed, the present invention also provides a saw as defined above which further comprises an upper guard to cover an upper portion of the blade, the guard being pivoted to said assembly, and parallelogram lever having a pivotal connection to the pivot member and upper guard whereby the orientation of said upper guard with respect to said pivot member is maintained, and an extension of said parallelogram lever co-operates with depth of cut adjustment means when said intermediate element is in its second disposition and when the saw assembly is in its second position.

Said adjustment means may comprise a worm gear rotationally mounted in a carrier member, which carrier member is adjustably connected, preferably pivoted, to said pivot member, and said extension may have a rack to engage said worm gear, rotation of the worm gear when engaged with said rack serving to pivot said parallelogram lever about its pivot to the pivot member to alter the depth of protrusion of the blade through the slot.

Said intermediate element may comprise a toggle lever pivoted to the pivot member which in said first disposition tensions said spring means and, in pivoting to said second disposition, releases said tension and pivots said carrier into engagement with said extension.

Said carrier and toggle lever may be pivoted about the same axis in said pivot member.

Said spring means may comprise a torsion spring around the pivot axis of the saw assembly in the pivot member, one end of said spring pressing against the saw assembly and the other end engaging said toggle lever. An intermediate lever may be disposed between said other end and said toggle lever.

Figure 2A:
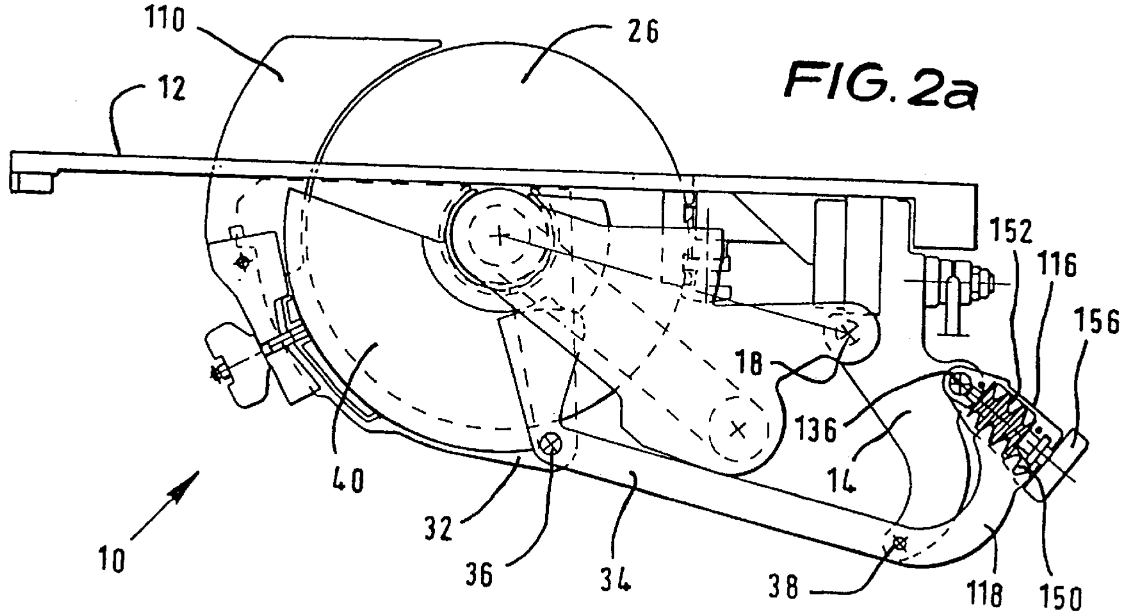
Figure 3A:
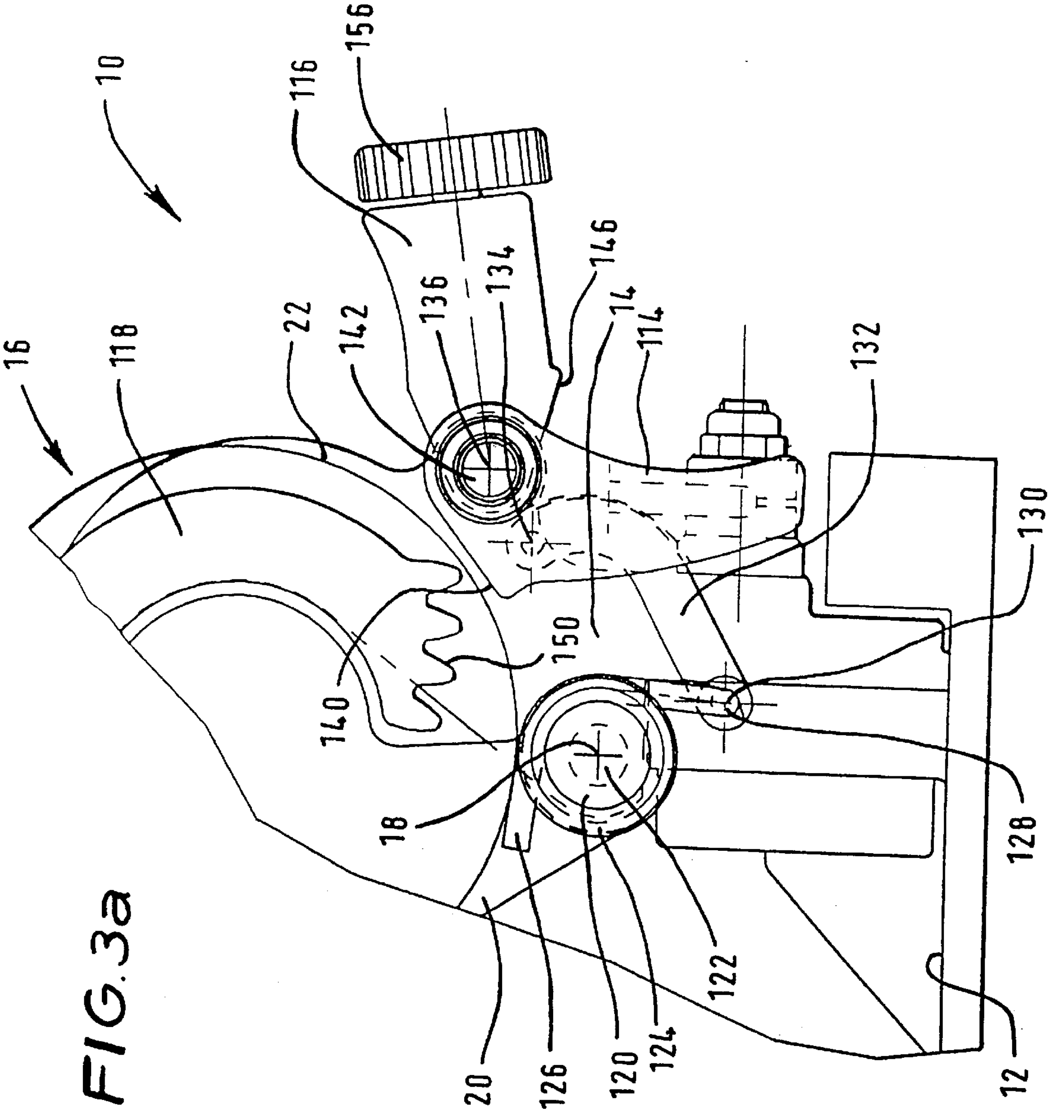
Figure 3C:
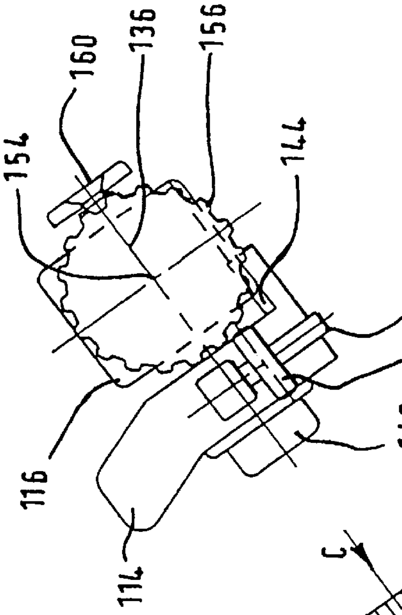
Figure 3B:
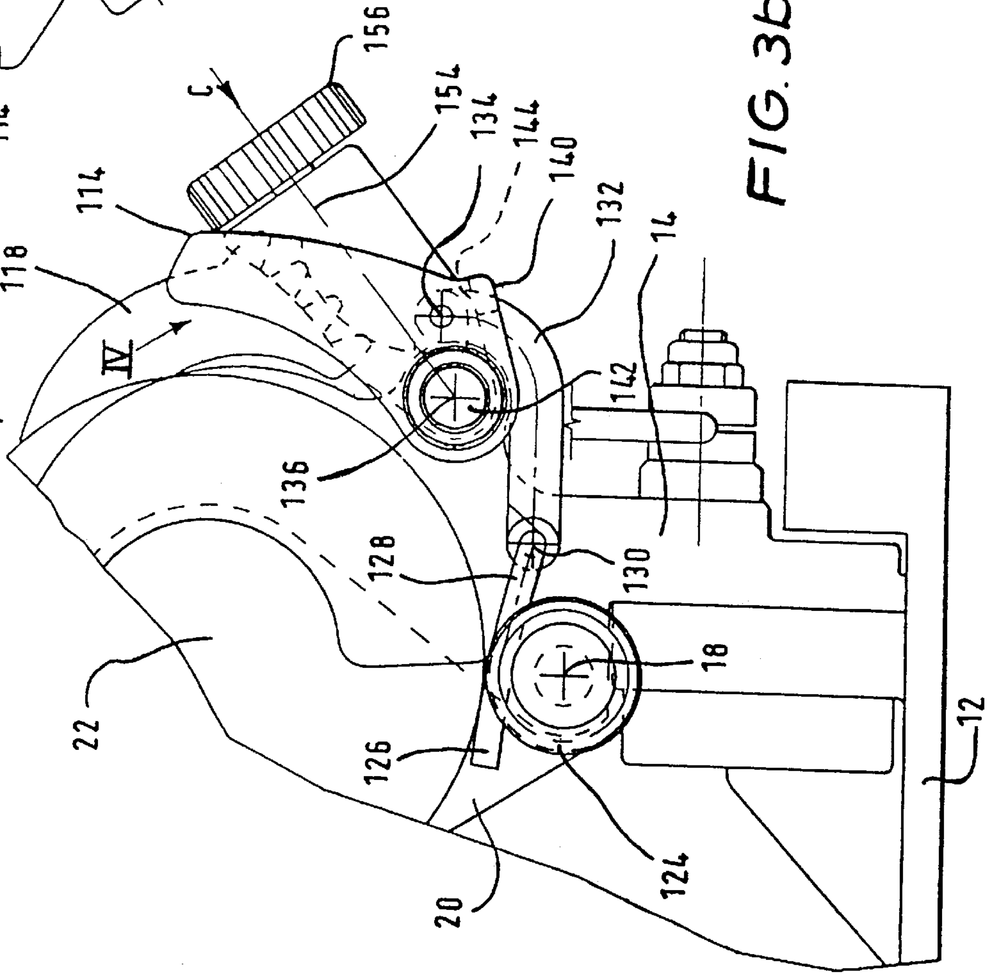

The invention is further described hereinafter, by way of example only, with reference to the accompanying drawings, in which:

FIGS. 1*a* to *d* are side views in different positions of a saw according to the present invention in chop saw mode;

FIGS. 2*a* and *b* are side views in two different positions of the saw of FIG. 1 in bench saw mode;

FIGS. 3*a* and *b* are side views of a spring release device according to the present invention in first and second dispositions thereof respectively;

FIG. 3*c* is a view in the direction of arrow C in FIG. 3*b;*

Figures 4A, 4B, 5A, 5B:
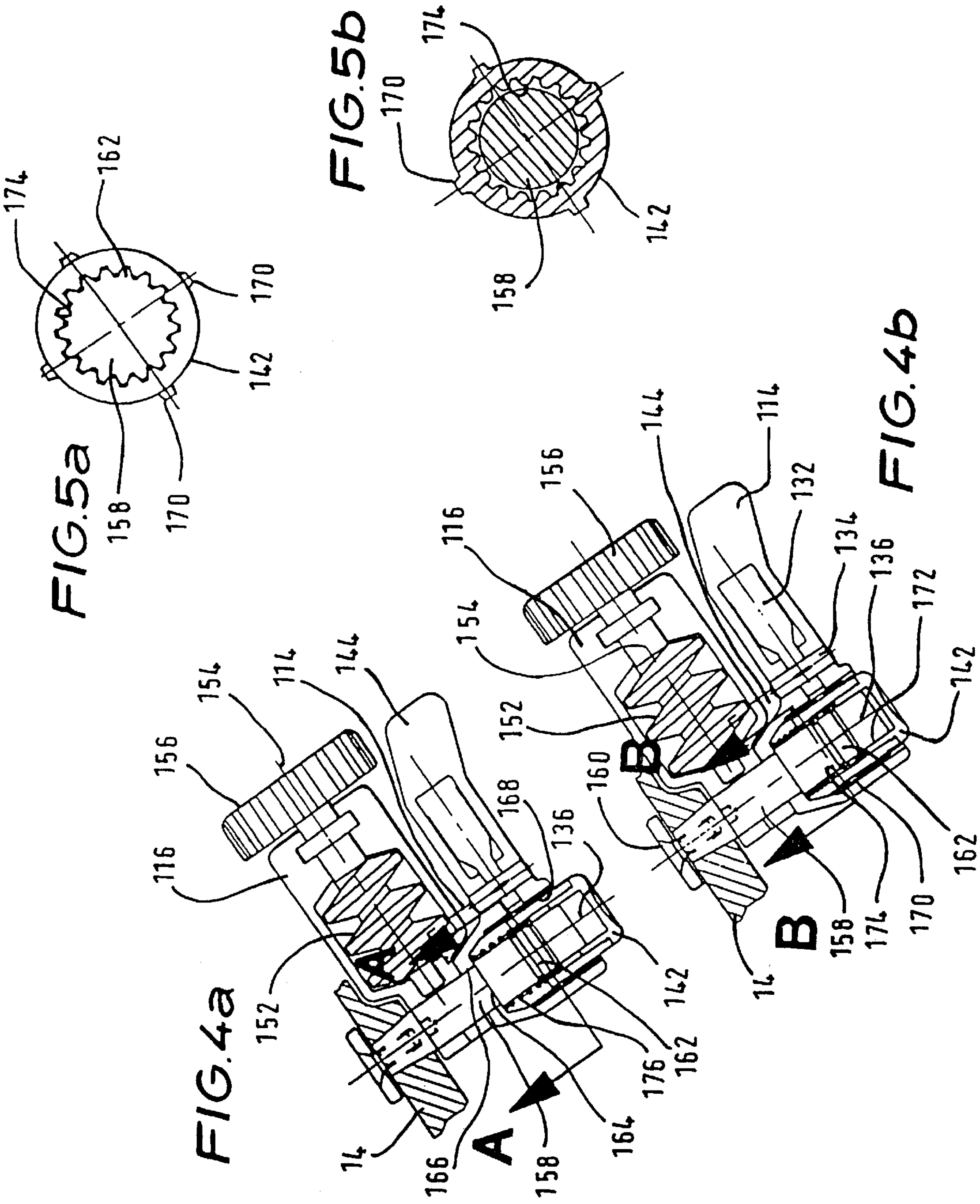

FIGS. 4*a* and *b* are views in the direction of arrow IV in FIG. 3*b;*

Figure 6:
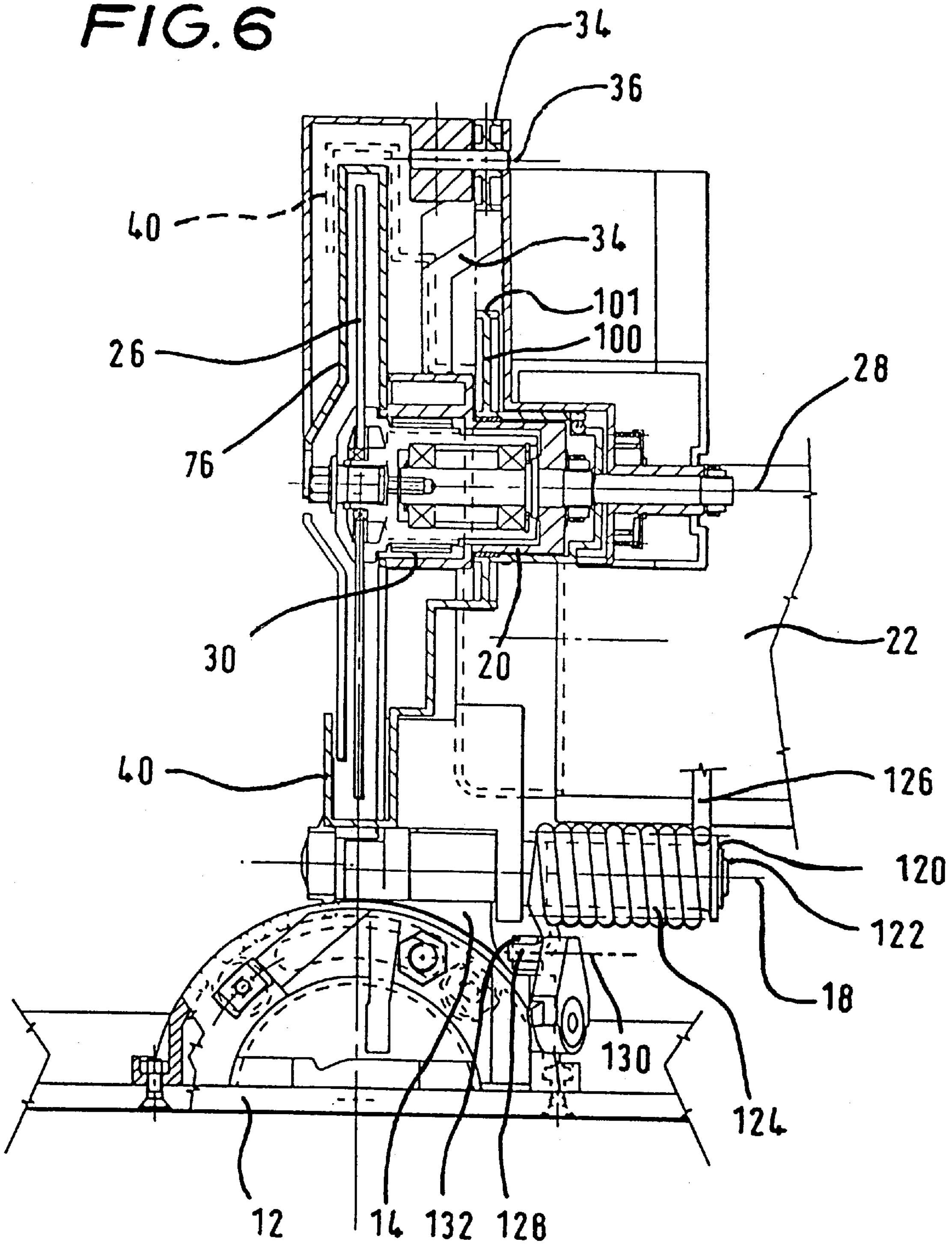

FIGS. 5*a* and *b* are sections along the lines A—A and B—B in FIGS. 4*a* and 4*b* respectively; and, FIG. 6 is a sectional view on the line VI—VI in FIG. 1*a*

Referring first to FIG. 1*a,* a saw 10 according to the invention comprises a table 12 having a pivot member 14 to which a saw assembly 16 is pivoted about axis 18.

The saw assembly 16 comprises a housing 20 mounting a motor 22 having a rotation axis 24. The motor 22 drives a circular saw blade 26 mounted in the housing 20 about axis 28 through a belt 30 drive connection.

An upper guard 32 is pivotally mounted in the housing 20 about 20 axis 28. It is connected to the pivot member 14 by parallelogram lever 34 pivoted at both ends about axes 36,38. Lines joining axes 36,38 and 18,28 are parallel.

A lower guard 40 is likewise pivotally mounted in the housing 20 about axis 28. It is opened by means of an actuator lever (not shown) to expose the blade 26. When this is done, the assembly 16 is capable of pivoting down about axis 18 to plunge the blade 26 into a workpiece (not shown) supported on the table 12 against a fence 42. The table 12 has a slot (not shown) through which the blade passes as the assembly pivots down to the position shown in FIG. 1*d.*

The parallelogram lever 34 maintains the orientation of the upper guard 32 with respect to the pivot member 14 and hence the table 12.

In FIGS. 1*a* to *d* the saw 10 is shown in four positions in which the lower guard 40 is in four different positions.

The parallelogram lever 34 has an extension 35 which abuts top surface 101 of a flange 100 of the guard 40. Analysis of the geometry of the arrangement demonstrates that saw assembly 16 cannot pivot downwards from the position shown in FIG. 1*a* about axis 18 while extension 35 abuts flange 100. This forms a lock which is released by opening the guard 40 by said actuator lever to the position shown in FIG. 1*b.* Here the flange 100 has moved out from underneath the extension 35 and so the assembly is now permitted to pivot about axis 18.

In FIG. 1*c,* the assembly 16 is pivoted down about axis 18 to cut workpieces positioned on the table 12 against fence 42. Between the positions in FIGS. 1*b* and *c,* the extension 35 engages a cam surface 103 of the flange 100 so that downward movement of the assembly 16 opens further the guard 40. In FIG. 1*d,* the guard is fully withdrawn inside the upper guard 32.

The saw 10 so far described is a chop saw, but table 12 is preferably mounted in a frame enabling it to be inverted.

A suitable mechanism for this arrangement is described in British patent application no. 9218363, although either of the arrangements shown in EP 0502350 or DE 1628992 will suffice.

In FIGS. 2*a* and *b* the saw 10 is shown inverted for use as a bench saw in which the blade 26 protrudes through the slot (not shown) in the table 12.

Figure 2B:
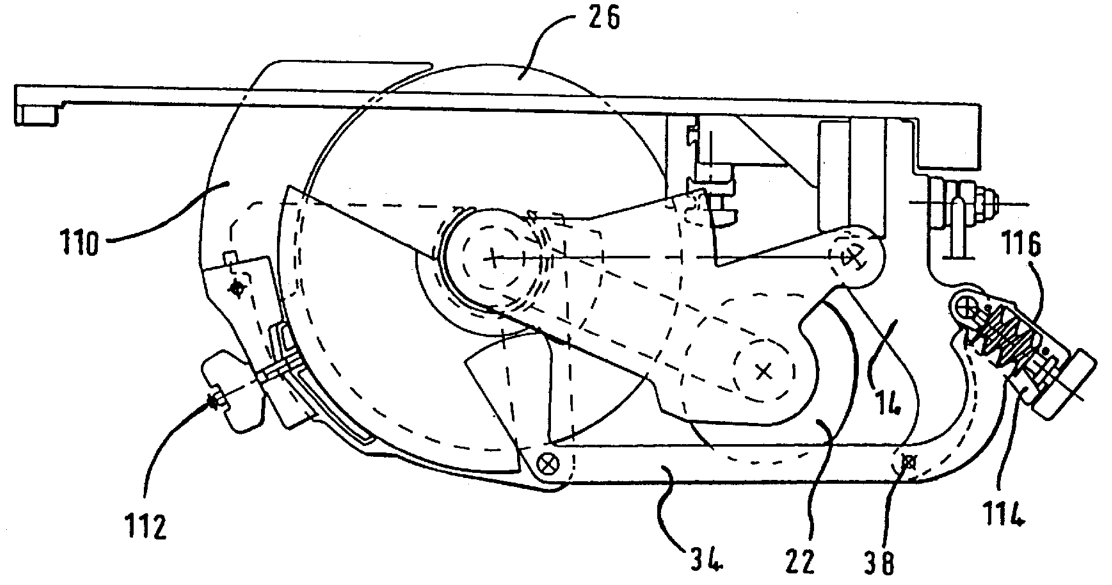

Before the table is flipped over, two features are brought into effect. In the FIG. 1*a* position, a riving knife 110 is rotated about an axis 112 through 180°. This brings it to its effective position for rip-sawing in the bench saw mode shown in FIG. 2. Obviously the knife cannot be rotated about axis 112 when in this position.

Secondly, when in the FIG. 1*a* position, a spring release toggle lever 114 is actuated as described further below to release spring pressure urging the saw assembly towards the rest position of the saw of FIG. 1*a* and simultaneously bring worm gear carrier 116 also described further below into engagement with another extension 118 of the parallelogram lever 34. This serves to lock the saw assembly in the position shown in FIGS. 2*a* and *b* so that it can be flipped over to that orientation.

Referring now to FIGS. 3*a* to *c,* the housing 20 of the saw assembly 16 has a sleeve 120 rotatably journalled on axle 122 of pivot member 14 to form pivot axis 18. Around the sleeve 120 is wound a torsion spring 124, one end 126 of which abuts the housing of motor 22 connected to the housing 20 of the saw assembly 16. The other end 128 of the spring is pivoted about axis 130 to intermediate lever 132. The other end of lever 132 is pivoted to toggle lever 114 about axis 134. Toggle lever 114 is pivoted to the pivot member 14 about axis 136. The lever is shown in FIG. 3*a* in its first disposition, in which it is placed when the saw 10 is used as a chop saw as shown in FIGS. 1*a* to *d.* Here, the lever is rotated clockwise to its maximum extent whereupon a heel 140 thereof abuts the motor housing 22. The spring 124 is in this position sufficiently tensioned so that its end 126 can support the weight of the saw assembly 16.

On pressing knob 142 (see FIG. 3*c*) described further below, the toggle lever 114 can be rotated anti-clockwise, progressively relieving the tension of the spring 124. It is advisable during this maneuvre for the user to take the weight of the saw assembly and let it drop slowly into the table 12. In its second disposition shown in FIG. 3*b,* a leg 144 of the toggle lever 114 has abutted a heel 146 of the worm gear carrier 116 and brought it into engagement with a rack 150 formed on the end of extension 118 of the parallelogram lever 34. The rack 150 comes into engagement with the carrier when the saw assembly drops near the table 12 and just before the blade 26 penetrates the slot in the table.

Turning to FIGS. 4*a* and *b,* the worm gear carrier 116 carries a worm gear 152 which is rotatable in the carrier about a longitudinal axis 154 by a knob 156 formed on one end of the gear. When engaged with the rack 150, as shown in FIG. 3*b,* turning of the knob 156 rotates the gear 152 and moves the rack 150 substantially in the direction of axis 154 and pivots the parallelogram lever about its axis 38 with respect to the pivot member 14 and in so doing raises and lowers the saw assembly 16 with respect to the table 12. Because the tension of the spring 124 has been released, only the weight of the saw assembly 16 need be supported by the worm gear 152. Accordingly, this gear can have a relatively coarse thread so that only a few turns of the knob 156 is required to effect adjustment of the depth of cut of the blade 26 protruding through the table 12 between the positions shown in FIGS. 2*a* and *b.* If, however, the spring 124 was still fully tensioned, then this would more than double the load on the worm gear, and indeed on the lever 34,118, and such a coarse thread would not be practical.

To move the toggle lever 114 between its two positions necessitates the release of a lock. If a lock was not provided, inadvertent release of the lever from its position shown in FIG. 3*a* could have disastrous consequences. Any form of lock will suffice, but FIGS. 4 and 5 show one suitable embodiment.

Axis 136 is formed by an axle 158 secured to the pivot member 14 by screw 160. Carrier 116 freely pivots on the axle. A shoulder 164 of the axle retains a collar 166 of the toggle lever 114 on the axle. A bore 168 of the toggle lever receives the knob 142 referred to above. The knob has four splines 170 which engage corresponding slots in the bore 168 so that the knob is constrained to rotate with the lever 114 about axle 158. However, the axle is itself provided with a short splined section 162 and a bore 172 of the knob is likewise provided with a corresponding splined section 174.

The knob is biassed by a spring 176 to the position shown in FIG. 4*a,* and in which position the splined sections 162,174 of the axle 158 and knob 142 respectively coincide (see FIG. 5*a*). Thus the lever 114 is rotationally locked on the axle 158. If the knob 142 is depressed, however, compressing the spring 176, the splines 162,174 are disengaged and the lever 1 14 can be tunied (see FIGS. 4*b* and 5*b*).

Finally, returning to FIGS. 3*a* and *b,* the spring 124 is arranged to be twisted so that its ends are at about 900 to each other in the raised, at-rest position. A further 45° or more may be added during pivoting to the FIG. 1*d* position. The spring force acts between the axes 130 and 134, which can be seen to tend to turn the lever 114 clockwise. In this position, heel 140 abuts the motor 22 and in any event, the line of axes 130,134 is so close to the axis 136 that the torque on the lever 114 is quite small, even at maximum spring compression.

On the other hand, the spring is arranged in the FIG. 3*b* position to be completely free so that there is no residual torque on the lever 114. Moreover, when the lever 114 is again operated from the FIG. 3*b* position to tension the spring 124, the line of axes 134,130 again serves to turn spring end 128 clockwise about axis 18. Although only a small torque can initially be applied (because that line is close to axis 18) the spring is free and offers only little resistance.

I claim:

1. A saw comprising:

a table;

a pivot member disposed on the table;

a saw assembly pivotably attached to the pivot member and pivoting about a first axis so that the saw assembly is movable towards the table, the saw assembly comprising a blade and a motor for driving the blade;

a spring for biasing the saw assembly away from the table, the spring having first and second ends, the first end contacting the saw assembly, and the spring having a longitudinal axis substantially coaxial with the first axis; and a movable intermediate element contacting the second end, the intermediate element being movable between first and second element positions;

wherein, in the first element position, bias of the spring biases the saw assembly away from the table and, in the second position, the bias of the spring is substantially removed.

2. The saw of claim 1, further comprising a frame connected to the table.

3. The saw of claim 2, wherein the table is pivotable relative to the frame between first and second table positions.

4. The saw of claim 3, wherein the saw assembly is above the table in the first table position.

5. The saw of claim 3, wherein the saw assembly is below the table in the second table position.

6. The saw of claim 1, further comprising an upper guard covering upper portion of the blade.

7. The saw of claim 6, wherein the upper guard is pivotably attached to the saw assembly.

8. The saw of claim 6, further comprising a parallelogram lever pivotably attached to the upper guard and the pivot member.

9. The saw of claim 8, wherein the parallelogram lever comprises an extension meshable with a height of cut adjustment means.

10. The saw of claim 8, wherein the adjustment means comprises:

a carrier member adjustably connected to the pivot member, and a worm gear rotationally mounted in the carrier member.

11. The saw of claim 10, wherein the extension has a rack meshable with the worm gear.

12. The saw of claim 10, wherein the intermediate element comprises a toggle lever pivotably attached to the pivot member.

13. The saw of claim 12, wherein the carrier member and the toggle lever are pivotable about a second axis.

14. The saw of claim 1, wherein an intermediate lever is disposed between the second end and the intermediate member.

15. The saw of claim 1, wherein the intermediate element comprises a toggle lever pivotably attached to the pivot member.

* * * * *